(12) United States Patent
Valenzuela et al.

(10) Patent No.: US 10,739,128 B2
(45) Date of Patent: Aug. 11, 2020

(54) LASER SCANNER SCANNING USING A COMPUTER NUMERICAL CONTROLLED (CNC) SYSTEM FOR MOVEMENT

(71) Applicant: The Boeing Company, Chicago, IL (US)

(72) Inventors: Dario I. Valenzuela, Mukilteo, WA (US); Clifford D. Borowicz, Seattle, WA (US)

(73) Assignee: The Boeing Company, Chicago, IL (US)

( * ) Notice: Subject to any disclaimer, the term of this patent is extended or adjusted under 35 U.S.C. 154(b) by 165 days.

(21) Appl. No.: 15/905,533

(22) Filed: Feb. 26, 2018

(65) Prior Publication Data

US 2019/0265021 A1    Aug. 29, 2019

(51) Int. Cl.
| | |
|---|---|
| *G01B 11/24* | (2006.01) |
| *G01B 11/00* | (2006.01) |
| *G05B 19/42* | (2006.01) |
| G05B 19/4097 | (2006.01) |
| B64F 5/10 | (2017.01) |
| G05B 19/401 | (2006.01) |

(52) U.S. Cl.
CPC ............ *G01B 11/24* (2013.01); *G01B 11/005* (2013.01); *G05B 19/4207* (2013.01); *B64F 5/10* (2017.01); *G05B 19/401* (2013.01); *G05B 19/4097* (2013.01)

(58) Field of Classification Search
CPC ...... G01B 11/24; G01B 11/005; G01B 5/008; B64F 5/60; B64F 5/00
USPC .......................................................... 33/503
See application file for complete search history.

(56) References Cited

U.S. PATENT DOCUMENTS

| | | | | |
|---|---|---|---|---|
| 4,908,951 A | * | 3/1990 | Gurny | G01B 11/005 33/1 M |
| 5,046,852 A | * | 9/1991 | Hametner | B21D 5/004 356/398 |
| 6,226,395 B1 | * | 5/2001 | Gilliland | B23K 9/1274 348/90 |
| 8,832,954 B2 | * | 9/2014 | Atwell | G01B 11/005 33/503 |
| 9,587,928 B2 | * | 3/2017 | Przygodda | G01B 21/045 |
| 2010/0153058 A1 | * | 6/2010 | Crothers | B23Q 17/20 702/150 |

(Continued)

FOREIGN PATENT DOCUMENTS

| | | |
|---|---|---|
| CN | 105404238 A | 3/2016 |
| CN | 106354094 A | 1/2017 |
| EP | 3168162 A1 | 5/2017 |

OTHER PUBLICATIONS

European Search report, dated Aug. 7, 2019, regarding Application No. 18214874.2, 11 pages.

(Continued)

*Primary Examiner* — Christopher W Fulton
(74) *Attorney, Agent, or Firm* — Yee & Associates, P.C.

(57) ABSTRACT

A first surface of a part is scanned with a laser scanner as a platform of a computer numerical controlled (CNC) gantry tool moves relative to the part to form scan data, in which the laser scanner is connected to the platform of the computer numerical controlled (CNC) gantry tool. Differences between the first surface and design for the first surface are determined using the scan data.

29 Claims, 15 Drawing Sheets

(56) References Cited

U.S. PATENT DOCUMENTS

| | | | |
|---|---|---|---|
| 2014/0157610 A1* | 6/2014 | Garvey | G01B 21/04 |
| | | | 33/503 |
| 2014/0236334 A1 | 8/2014 | Glasscock et al. | |
| 2014/0365061 A1 | 12/2014 | Vasquez et al. | |
| 2015/0105894 A1* | 4/2015 | Chang | G05B 19/401 |
| | | | 700/110 |
| 2015/0294032 A1 | 10/2015 | Lagally et al. | |
| 2015/0367579 A1 | 12/2015 | Laudrain | |
| 2016/0084633 A1* | 3/2016 | Ferrari | G01B 21/04 |
| | | | 33/503 |
| 2017/0045877 A1* | 2/2017 | Shapiro | B23K 26/082 |
| 2017/0248551 A1* | 8/2017 | Pelivanov | G01N 29/265 |

OTHER PUBLICATIONS

European Patent Office Extended Search report, dated Nov. 28, 2019, regarding Application No. 18214874.2, 11 pages.

* cited by examiner

LASER SCANNER SCANNING USING A COMPUTER NUMERICAL CONTROLLED (CNC) SYSTEM FOR MOVEMENT

BACKGROUND INFORMATION

1. Field

The present disclosure relates generally to manufacturing and, more specifically, to allowing for reduction of gaps in between two parts in manufacturing. Yet more specifically, the present disclosure relates to an apparatus and a method for scanning a part to reduce gaps between the part and a second part.

2. Background

In aircraft manufacturing, shims may be placed within gaps between parts. For example, shims may be placed between a panel and ribs or spars connected to the panel. Placing and manufacturing shims takes operator time and expertise.

Currently, to inspect large parts, inspection tools are brought into the manufacturing area. Set-up and operation of the inspection tools utilize operator time and expertise. Inspection time adds to manufacturing cycle time of the part. Accuracy of inspection affects the inspection time.

Therefore, it would be desirable to have a method and an apparatus that take into account at least some of the issues discussed above, as well as other possible issues. For example, it would be desirable to provide a method and an apparatus that inspect large parts with at least one of reduced inspection time or reduced operator time.

SUMMARY

An illustrative embodiment of the present disclosure provides a method. A first surface of a part is scanned with a laser scanner as a platform of a computer numerical controlled (CNC) gantry tool moves relative to the part to form scan data, in which the laser scanner is connected to the platform of the computer numerical controlled (CNC) gantry tool. Differences between the first surface and design for the first surface are determined using the scan data.

An illustrative embodiment of the present disclosure provides a system. The system comprises a laser scanner, a connection assembly fastened to the laser scanner, and a laser scanner operations support assembly operably connected to the laser scanner. The connection assembly is configured to removably connect the laser scanner to a platform of a computer numerical controlled (CNC) gantry tool. The laser scanner operations support assembly is configured to be connected to the computer numerical controlled (CNC) gantry tool.

Another illustrative embodiment of the present disclosure provides a method. A connection assembly is connected to a platform of a computer numerical controlled (CNC) gantry tool, in which the connection assembly is fastened to a laser scanner. The platform of the computer numerical controlled (CNC) gantry tool is moved relative to a part. A first surface of the part is scanned with the laser scanner as the platform of the computer numerical controlled (CNC) gantry tool moves relative to the part to form scan data.

Yet another illustrative embodiment of the present disclosure provides a method. A laser scanner is connected to a computer numerical controlled (CNC) gantry tool. A laser scanner operations support assembly is connected to the computer numerical controlled (CNC) gantry tool. A platform of the computer numerical controlled (CNC) gantry tool is moved relative to a part. Operation of the laser scanner is controlled using the laser scanner operations support assembly. A first surface of the part is scanned with the laser scanner as the platform of the computer numerical controlled (CNC) gantry tool moves relative to the part to form scan data.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
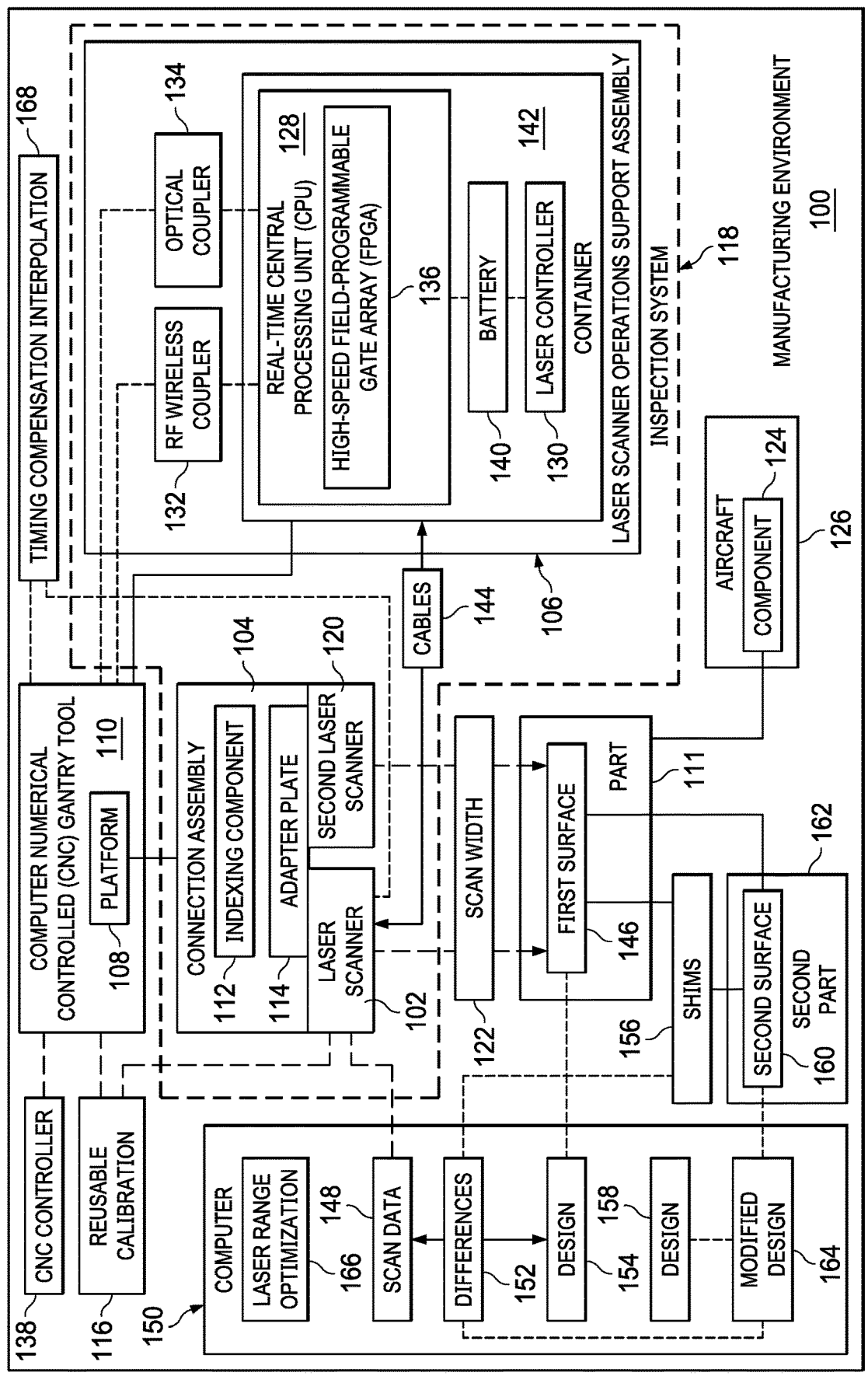
FIG. 1 is an illustration of a block diagram of a manufacturing environment in which a laser scanner connected to a computer numerical controlled (CNC) gantry tool may scan a part in accordance with an illustrative embodiment.

The illustrative embodiments recognize and take into account one or more different considerations. For example, the illustrative embodiments recognize and take into account that it is desirable to reduce manufacturing cost and time. The illustrative embodiments recognize and take into account that the prediction of shims in aircrafts parts may reduce at least one of manufacturing cost or time. The illustrative embodiments recognize and take into account that the manufacturing of a shimless part may reduce at least one of manufacturing cost or time. The illustrative embodiments recognize and take into account that the prediction of shims or the manufacturing of a shimless part may greatly reduce operator time. The illustrative embodiments recognize and take into account that the prediction of shims or the manufacturing of a shimless part may result in a more automated process.

The illustrative embodiments recognize and take into account that to enable at least one of prediction of shims or shimless part manufacturing, a method of high accuracy and speed scanning is desired. The illustrative embodiments recognize and take into account that to enable at least one of prediction of shims or shimless part manufacturing, it is desirable to obtain highly accurate and dense scan data of one or both mating parts. The illustrative embodiments recognize and take into account that this scan data could then be used to generate a predictive shim ahead of time. The illustrative embodiments recognize and take into account that this scan data could be used to produce shimless manufacturing by machining the second part to match the first part.

The illustrative embodiments recognize and take into account that creating desirably accurate scan data becomes more challenging as parts get very large. For example, the illustrative embodiments recognize and take into account that creating desirably accurate scan data of an aircraft wing may be challenging.

The illustrative embodiments recognize and take into account that using a conventional laser tracker for scanning large structures has a limitation on the distance the laser tracker can reach. The illustrative embodiments recognize and take into account that using a conventional laser tracker uses multiple set-ups to scan a large part. The illustrative embodiments recognize and take into account that each set-up utilizes operator time and adds manufacturing cycle time to the part. The illustrative embodiments recognize and take into account that conventional laser tracker systems may take over eight hours to scan an aircraft wing.

The illustrative embodiments recognize and take into account that accuracy of a conventional laser tracker reduces as distance of scanning location increases from the laser tracker. The illustrative embodiments recognize and take into account that accuracy of a conventional laser tracker is affected by temperature fluctuations.

The illustrative embodiments recognize and take into account that when a laser inspection system does not have a desirable resolution, a different laser inspection system with better accuracy and better resolution is typically selected.

The illustrative embodiments recognize and take into account that operators desire simple set-up of equipment. The illustrative embodiments recognize and take into account that it may be desirable to minimize cables, such as power cables, data transmission cables, or other utility lines within a manufacturing environment.

The illustrative embodiments recognize and take into account that it is desirable to reduce costs of scanning equipment. The illustrative embodiments provide an apparatus and a method to obtain scan data at a desired accuracy and speed to enable at least one of predictive shimming or shimless manufacturing at a large scale.

Referring now to the figures and, in particular, with reference to FIG. 1, an illustration of a block diagram of a manufacturing environment in which a laser scanner connected to a computer numerical controlled (CNC) gantry tool may scan a part is depicted in accordance with an illustrative embodiment. Manufacturing environment 100 includes laser scanner 102, connection assembly 104, and laser scanner operations support assembly 106. Connection assembly 104 is fastened to laser scanner 102. Connection assembly 104 is configured to removably connect laser scanner 102 to platform 108 of computer numerical controlled (CNC) gantry tool 110. Laser scanner operations support assembly 106 is operably connected to laser scanner 102 and is configured to be connected to computer numerical controlled (CNC) gantry tool 110.

By connecting laser scanner 102 to computer numerical controlled (CNC) gantry tool 110, movement of computer numerical controlled (CNC) gantry tool 110 is used to move laser scanner 102 within manufacturing environment 100. Computer numerical controlled (CNC) gantry tool 110 may be used for manufacturing processes prior to inspection using laser scanner 102.

By connecting laser scanner 102 to computer numerical controlled (CNC) gantry tool 110, a pre-existing movement system is leveraged. By connecting laser scanner 102 to computer numerical controlled (CNC) gantry tool 110, indexing of part 111 relative to computer numerical controlled (CNC) gantry tool 110 may be applied to laser scanner 102. By connecting laser scanner 102 to computer numerical controlled (CNC) gantry tool 110, additional movement systems for laser scanner 102 are not brought into manufacturing environment 100.

By connecting laser scanner 102 to computer numerical controlled (CNC) gantry tool 110, a desirably high global accuracy and desirably high precision is accomplished. By connecting laser scanner 102 to computer numerical controlled (CNC) gantry tool 110, a global accuracy greater than independent metrology systems may be accomplished. By connecting laser scanner 102 to computer numerical controlled (CNC) gantry tool 110, laser scanner 102 may be part of a retrofit. Although computer numerical controlled (CNC) gantry tool 110 is depicted, laser scanner 102 may be connected to any desirable CNC system.

Connection assembly 104 comprises indexing component 112 and adapter plate 114. Laser scanner 102 is fastened to connection assembly 104 at adapter plate 114. Indexing component 112 is configured to repeatedly index laser scanner 102 relative to platform 108 of computer numerical controlled (CNC) gantry tool 110. Indexing component 112 has sufficient accuracy to allow a single calibration, reusable calibration 116, of laser scanner 102 attached to computer numerical controlled (CNC) gantry tool 110 to be applied to each subsequent attachment of laser scanner 102 to computer numerical controlled (CNC) gantry tool 110. By using reusable calibration 116 for each subsequent attachment of laser scanner 102 to computer numerical controlled (CNC) gantry tool 110, set-up time for inspection system 118 is reduced.

In some illustrative examples, inspection system 118 may optionally include second laser scanner 120. When second laser scanner 120 is present, laser scanner 102 and second laser scanner 120 are both fastened to adapter plate 114. When second laser scanner 120 is present, scan width 122 of inspection system 118 increases. By increasing scan width 122, scan time for part 111 is reduced. By increasing scan width 122, the quantity of passes of inspection system 118 across part 111 is reduced.

In some illustrative examples, part 111 is component 124 of aircraft 126. Part 111 may take the form of any desirable component of aircraft 126. In some illustrative examples, part 111 is at least one of a rib, a spar, or a panel. In some illustrative examples, part 111 is a portion of a wing of aircraft 126.

As depicted, laser scanner operations support assembly 106 comprises real-time central processing unit (CPU) 128, laser controller 130, and at least one of RF wireless coupler 132 or optical coupler 134. As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

At least one of RF wireless coupler 132 or optical coupler 134 is used to communicate between real-time central processing unit (CPU) 128 and at least one of CNC controller 138 or computer numerical controlled (CNC) gantry tool 110. CNC controller 138 is in communication with computer numerical controlled (CNC) gantry tool 110 and real-time central processing unit (CPU) 128 of laser scanner operations support assembly 106. Both RF wireless coupler 132 and optical coupler 134 provide communications without running wires within computer numerical controlled (CNC) gantry tool 110. Running wires within computer numerical controlled (CNC) gantry tool 110 would involve an undesirable amount of time and operator effort.

In some illustrative examples, real-time central processing unit (CPU) 128 includes high-speed field-programmable gate array (FPGA) 136. When high-speed field-programmable gate array (FPGA) 136 is present, high-speed field-programmable gate array (FPGA) 136 enables faster data transfer.

In some illustrative examples, laser scanner operations support assembly 106 further comprises battery 140. In these illustrative examples, battery 140 is electrically connected to laser controller 130 and real-time central processing unit (CPU) 128.

In some illustrative examples, components of laser scanner operations support assembly 106 are housed within container 142. Container 142 is configured to be removably connected to computer numerical controlled (CNC) gantry tool 110. Container 142 may take any desirable form. In some illustrative examples, container 142 may be described as a "box." In some illustrative examples, battery 140, real-time central processing unit (CPU) 128, and laser controller 130 are in container 142 removably connected to computer numerical controlled (CNC) gantry tool 110.

By connecting components of laser scanner operations support assembly 106 to computer numerical controlled (CNC) gantry tool 110, cables 144 connecting laser scanner 102 and laser scanner operations support assembly 106 are shorter. By reducing lengths of cables 144, laser noise is reduced for laser scanner 102.

When battery 140 is present, fewer cables may be present within inspection system 118. When battery 140 is present, power cables within inspection system 118 are shorter.

When laser scanner 102 is attached to computer numerical controlled (CNC) gantry tool 110, laser scanner 102 scans first surface 146 of part 111 to form scan data 148. Scan data 148 takes any desirable form. In some illustrative examples, scan data 148 takes the form of a series of points. In some illustrative examples, scan data 148 may have greater sampling in areas of interest of first surface 146. In some illustrative examples, scan data 148 may have greater sampling in areas where part 111 will mate with other parts. For example, when part 111 is a panel configured to receive ribs, scan data 148 may contain greater sampling at rib landing locations.

In some illustrative examples, scan data 148 is extracted or selectively saved. For example, although laser scanner 102 scans all of first surface 146, points within areas of interest may be extracted and saved.

As depicted, scan data 148 is saved to computer 150. In other illustrative examples, scan data 148 may be stored in a different location than computer 150. Scan data 148 may be stored in any desirable location.

Scan data 148 is used to perform shimless manufacturing or create predicted shims. Differences 152 between first surface 146 and design 154 for first surface 146 are determined using scan data 148. In some illustrative examples, shims 156 are manufactured based on differences 152. In these illustrative examples, differences 152 are used in predictive shimming.

In some illustrative examples, design 158 for second surface 160 of second part 162 is modified using differences 152 to form modified design 164. Modified design 164 is configured to mate with first surface 146 of part 111. Modified design 164 for second part 162 eliminates shims between part 111 and second part 162 for shimless manufacturing.

In some illustrative examples, part 111 is a panel and second part 162 is a rib. In these illustrative examples, gaps may exist between the rib and the panel in the Z-direction. In these illustrative examples, differences 152 are in the Z-direction, normal to part 111. In these illustrative examples, shims 156 are used to fill gaps in a direction normal to part 111. Although differences 152 are discussed in the Z-direction, differences 152 may exist in any axis.

Laser scanner 102 has a desirable cost. Reducing cost but achieving increased accuracy is desirable. In some illustrative examples, laser range optimization 166 is performed to improve data quality of scan data 148.

Lasers, including laser scanner 102, are susceptible to distances and range. Laser range optimization 166 allows for compensation of laser position at a set range.

Laser range optimization 166 is performed by scanning a planar surface using laser scanner 102. Each laser has its own signature. Laser scanner 102 will have its own respective signature unique to laser scanner 102. A shape of scan data obtained by scanning a planar surface with laser scanner 102 is used to compensate for the signature of laser scanner 102. In some illustrative examples, laser range optimization 166 generates a look-up table to compensate for the signature of laser scanner 102.

Laser range optimization 166 increases the resolution of laser scanner 102. Laser range optimization 166 improves laser scanner 102 rather than replacing laser scanner 102 with a higher resolution laser scanner.

Timing compensation interpolation 168 is performed to correlate locations of computer numerical controlled (CNC) gantry tool 110 with laser scanner 102. Timing compensation interpolation 168 takes into account delays between receipt of data from computer numerical controlled (CNC) gantry tool 110 by real-time central processing unit (CPU) 128 and actual location of real-time central processing unit (CPU) 128. Timing compensation interpolation 168 enables more frequent sampling from laser scanner 102 than position updates of computer numerical controlled (CNC) gantry tool 110.

Timing compensation interpolation 168 allows for pulsing of laser scanner 102 between position updates of computer numerical controlled (CNC) gantry tool 110. Timing compensation interpolation 168 increases the speed of scanning of part 111.

In some illustrative examples, for timing compensation interpolation 168, spacing between each of the data points of scan data 148 is assumed to be linear. Timing compensation interpolation 168 also takes into account delay in the system in communicating between computer numerical controlled (CNC) gantry tool 110 and inspection system 118.

The illustration of manufacturing environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 2:
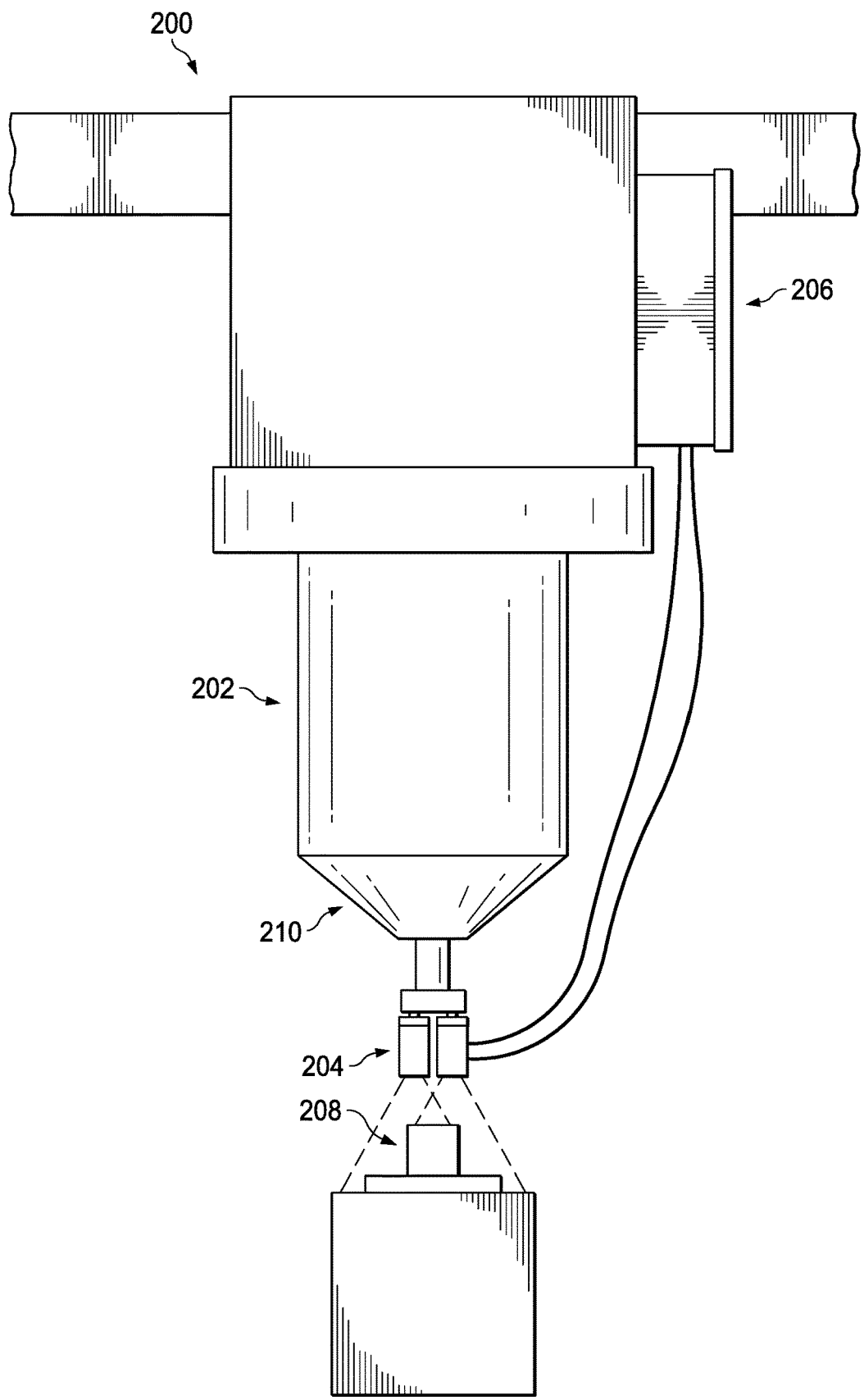
FIG. 2 is an illustration of a front view of an inspection system including a laser scanner connected to a computer numerical controlled (CNC) gantry tool in a manufacturing environment in accordance with an illustrative embodiment.

Turning now to FIG. 2, an illustration of a front view of an inspection system including a laser scanner connected to a computer numerical controlled (CNC) gantry tool in a manufacturing environment is depicted in accordance with an illustrative embodiment. Manufacturing environment 200 is a physical implementation of manufacturing environment 100 of FIG. 1. Manufacturing environment 200 includes computer numerical controlled (CNC) gantry tool 202, laser scanner 204, and laser scanner operations support assembly 206.

Computer numerical controlled (CNC) gantry tool 202 is a physical implementation of computer numerical controlled (CNC) gantry tool 110 of FIG. 1. Computer numerical controlled (CNC) gantry tool 202 moves within manufacturing environment 200 to perform operations on part 208. By attaching laser scanner 204 to platform 210 of computer numerical controlled (CNC) gantry tool 202, computer numerical controlled (CNC) gantry tool 202 is used to move laser scanner 204 within manufacturing environment 200.

Computer numerical controlled (CNC) gantry tool 202 has desirable precision for scanning part 208 using laser scanner 204. In some illustrative examples, timing compensation interpolation is performed to correlate locations of computer numerical controlled (CNC) gantry tool 202 with laser scanner 204. Timing compensation interpolation takes into account delays between receipt of data from computer numerical controlled (CNC) gantry tool 202 and actual location. Timing compensation interpolation (not depicted) enables more frequent sampling from laser scanner 204 than position updates of computer numerical controlled (CNC) gantry tool 202.

By connecting laser scanner operations support assembly 206 to computer numerical controlled (CNC) gantry tool 202, connections between laser scanner operations support assembly 206 and laser scanner 204 are shorter. By connecting laser scanner operations support assembly 206 to computer numerical controlled (CNC) gantry tool 202, noise from laser scanner 204 may be reduced.

After scanning part 208, laser scanner 204 and laser scanner operations support assembly 206 may be removed from computer numerical controlled (CNC) gantry tool 202. After removing laser scanner 204 and laser scanner operations support assembly 206, computer numerical controlled (CNC) gantry tool 202 may be used to perform manufacturing operations.

Figure 3:
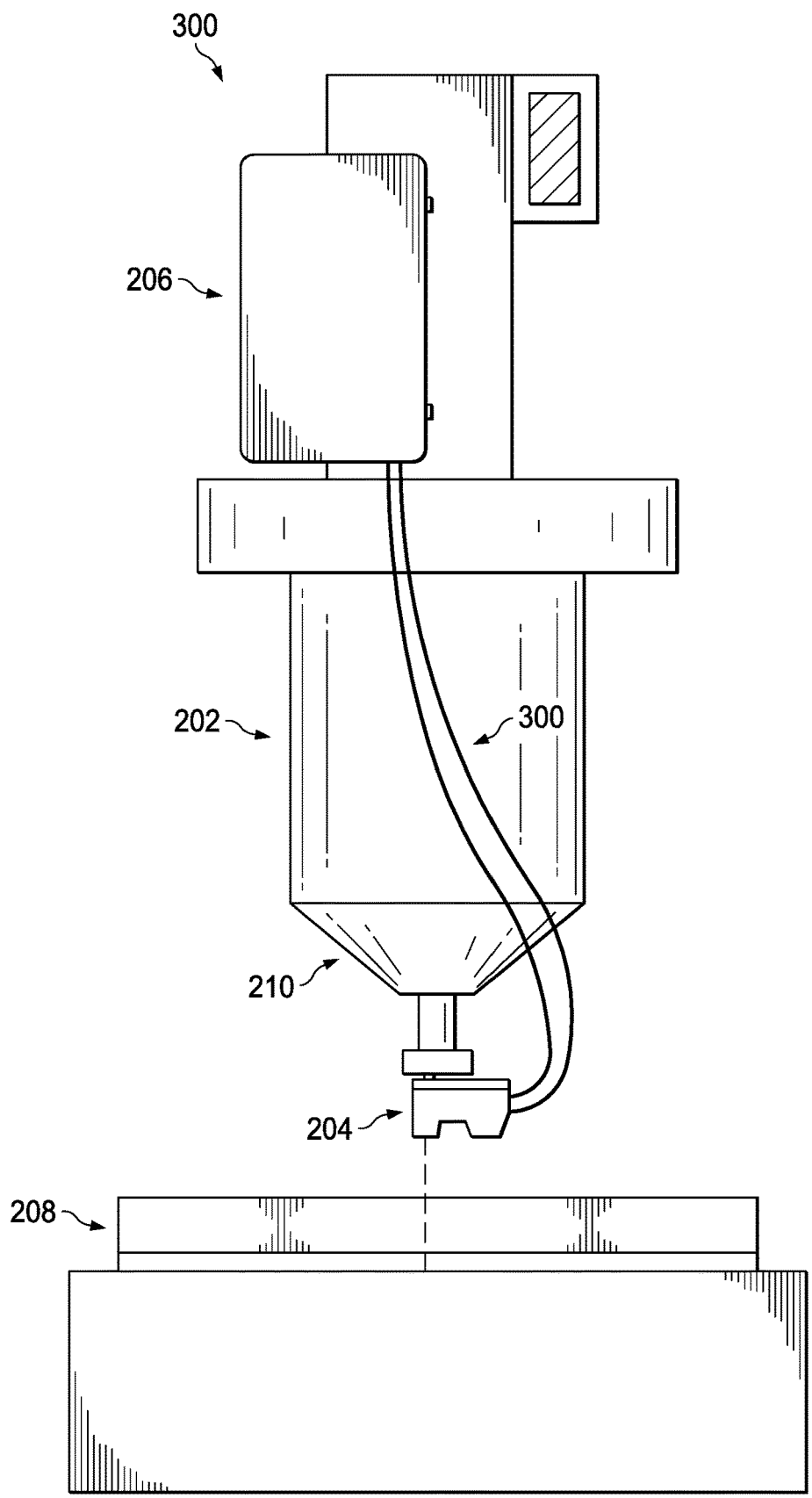
FIG. 3 is an illustration of a side view of an inspection system including a laser scanner connected to a computer numerical controlled (CNC) gantry tool in a manufacturing environment in accordance with an illustrative embodiment.

Turning now to FIG. 3, an illustration of a side view of an inspection system including a laser scanner connected to a computer numerical controlled (CNC) gantry tool in a manufacturing environment is depicted in accordance with an illustrative embodiment. Cables 300 between laser scanner operations support assembly 206 and laser scanner 204 are visible. Cables 300 may be restrained to remain out of a processing area of computer numerical controlled (CNC) gantry tool 202.

Figure 4:
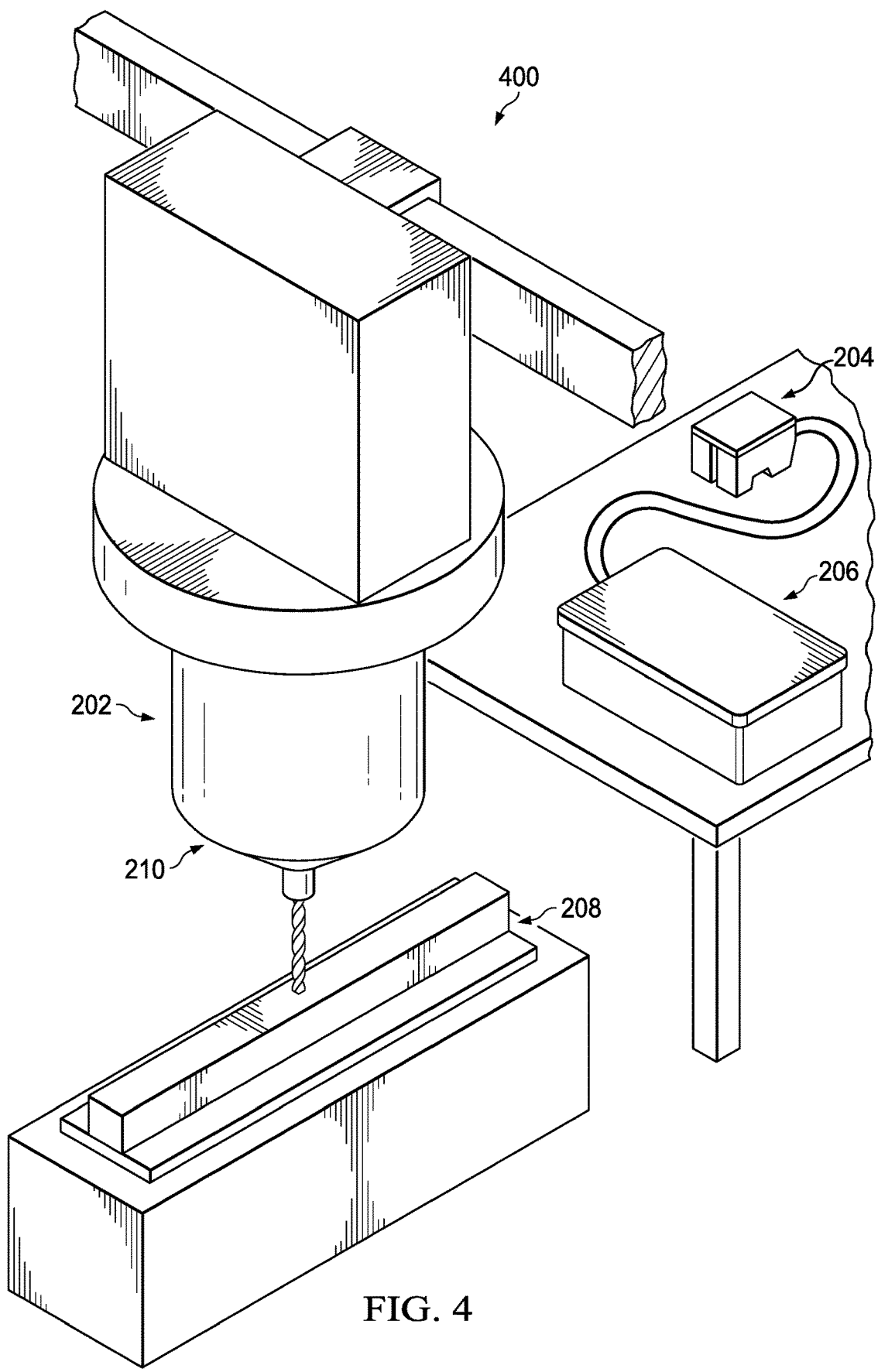
FIG. 4 is an illustration of a manufacturing environment with a computer numerical controlled (CNC) gantry tool, a laser scanner, and a laser scanner operations support assembly in accordance with an illustrative embodiment.

Turning now to FIG. 4, an illustration of a manufacturing environment with a computer numerical controlled (CNC) gantry tool, a laser scanner, and a laser scanner operations support assembly is depicted in accordance with an illustrative embodiment. In view 400, laser scanner 204 and laser scanner operations support assembly 206 are not connected to computer numerical controlled (CNC) gantry tool 202. As depicted, computer numerical controlled (CNC) gantry tool 202 may be used to perform manufacturing operations such as milling or drilling.

Figure 5:
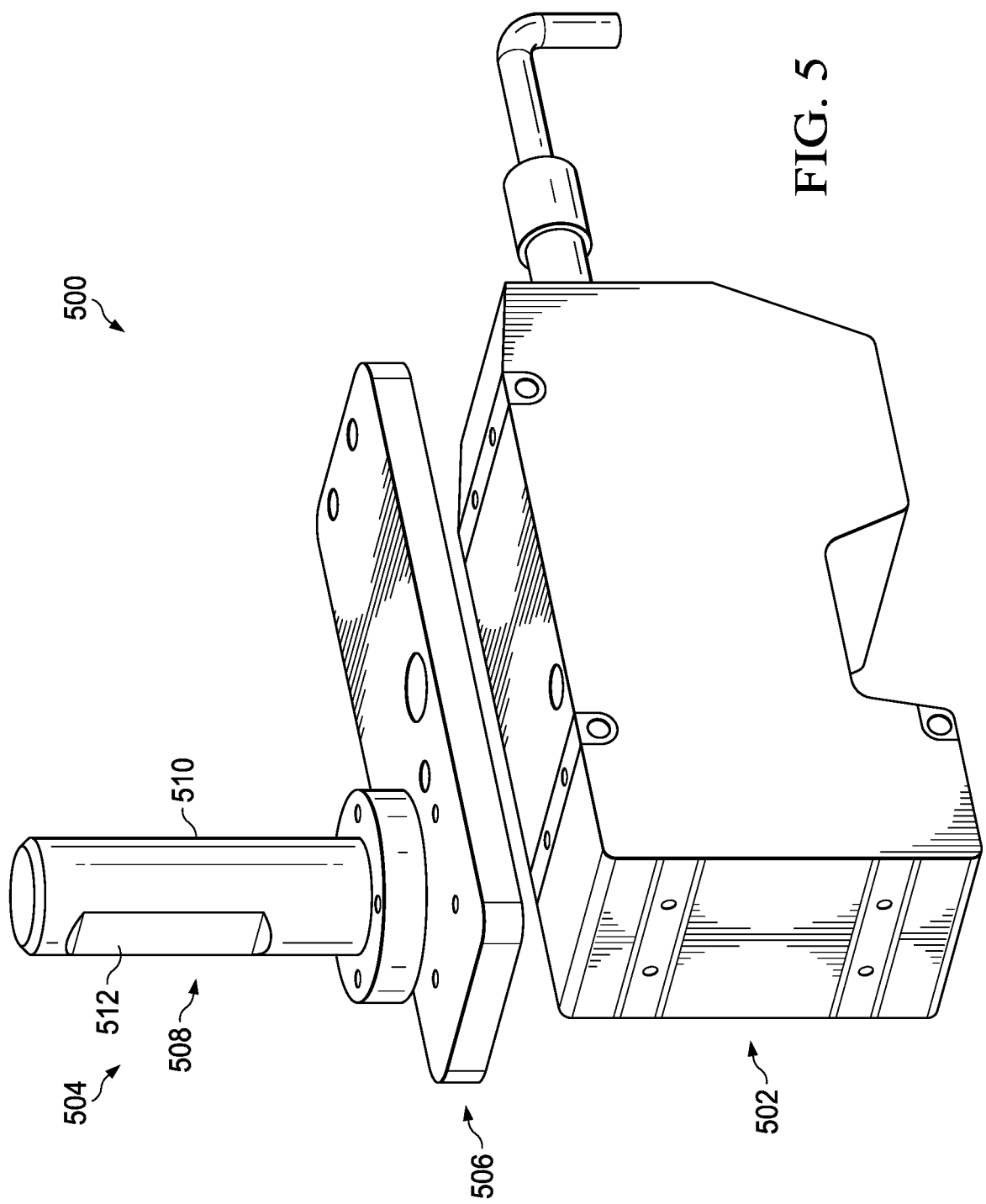
FIG. 5 is an illustration of a laser scanner and a connection assembly in accordance with an illustrative embodiment.

Turning now to FIG. 5, an illustration of a laser scanner and a connection assembly is depicted in accordance with an illustrative embodiment. As depicted in view 500, laser scanner 502 is not yet fastened to connection assembly 504. Laser scanner 502 may be fastened to adapter plate 506 of connection assembly 504 using any desirable fastener. Laser scanner 502 is a physical implementation of laser scanner 102 of FIG. 1.

Connection assembly 504 is a physical implementation of connection assembly 104 of FIG. 1. Connection assembly 504 is a mechanical attachment that aligns laser scanner 502 repeatedly to a computer numerical controlled (CNC) gantry tool, such as computer numerical controlled (CNC) gantry tool 110 of FIG. 1 or computer numerical controlled (CNC) gantry tool 202 of FIG. 2.

As depicted, indexing feature 508 extends from adapter plate 506 away from laser scanner 502. As depicted, indexing feature 508 takes the form of shaft 510. Shaft 510 may also be referred to as a dowel pin. Indexing feature 508 indexes into the shaft of a computer numerical controlled (CNC) gantry tool. As depicted, flat surface 512 is visible on shaft 510. Flat surface 512 provides repeatable clocking.

Figure 6:
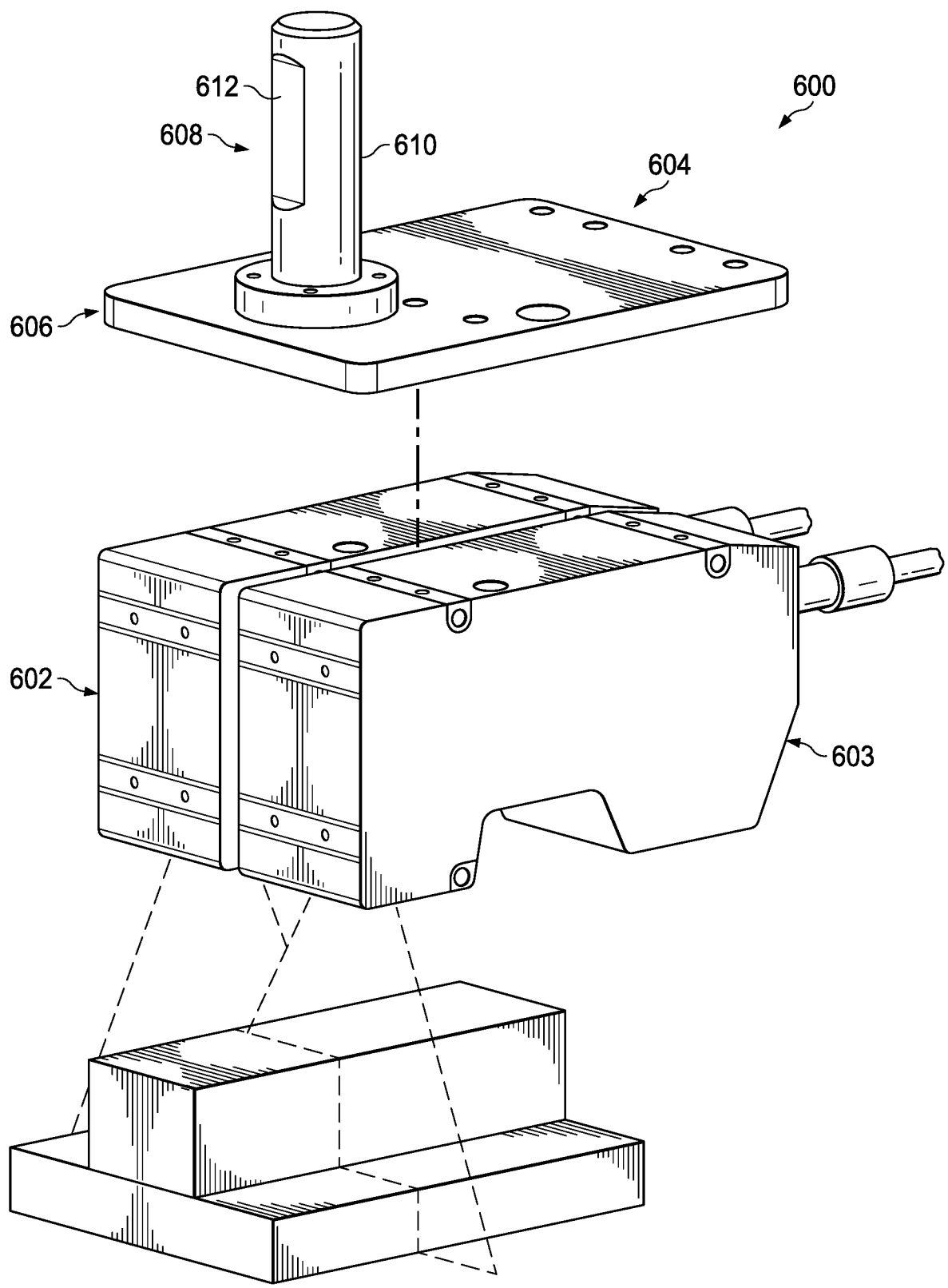
FIG. 6 is an illustration of two laser scanners and a connection assembly in accordance with an illustrative embodiment.

Turning now to FIG. 6, an illustration of two laser scanners and a connection assembly is depicted in accordance with an illustrative embodiment. As depicted in view 600, laser scanner 602 and second laser scanner 603 are not yet fastened to connection assembly 604. Laser scanner 602 and second laser scanner 603 may be fastened to adapter plate 606 of connection assembly 604 using any desirable type of fasteners. Laser scanner 602 is a physical implementation of laser scanner 102 of FIG. 1. Second laser scanner 603 is a physical implementation of second laser scanner 120.

Connection assembly 604 is a physical implementation of connection assembly 104 of FIG. 1. Connection assembly 604 is a mechanical attachment that aligns laser scanner 602 and second laser scanner 603 repeatedly to a computer numerical controlled (CNC) gantry tool, such as computer numerical controlled (CNC) gantry tool 110 of FIG. 1 or computer numerical controlled (CNC) gantry tool 202 of FIG. 2.

As depicted, indexing feature 608 extends from adapter plate 606 away from laser scanner 602. As depicted, indexing feature 608 takes the form of shaft 610. Shaft 610 may also be referred to as a dowel pin. Indexing feature 608 indexes into the shaft of a computer numerical controlled (CNC) gantry tool. As depicted, flat surface 612 is visible on shaft 610. Flat surface 612 provides repeatable clocking.

Figure 7:
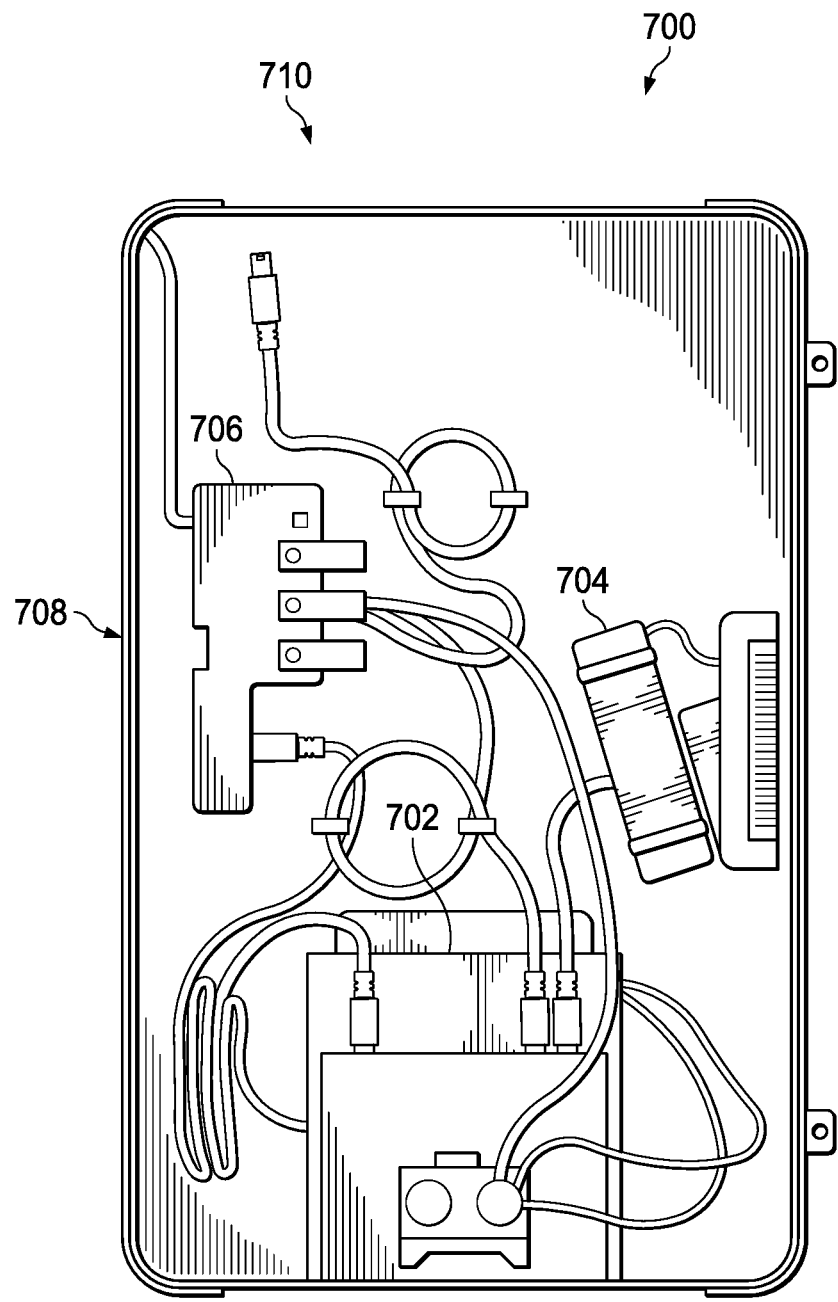
FIG. 7 is an illustration of a laser scanner operations support assembly in accordance with an illustrative embodiment.

Turning now to FIG. 7, an illustration of a laser scanner operations support assembly is depicted in accordance with an illustrative embodiment. Laser scanner operations support assembly 700 is a physical implementation of laser scanner operations support assembly 106 of FIG. 1. As depicted, real-time central processing unit (CPU) 702, laser controller 704, and battery 706 are within container 708. Container 708 is configured to be attached to a computer numerical controlled (CNC) gantry tool. View 710 may be a view within laser scanner operation support assembly 206 of FIG. 3.

In some illustrative examples, additional or fewer components may be present within laser scanner operations support assembly 700. For example, battery 706 may be optional.

Figure 8:
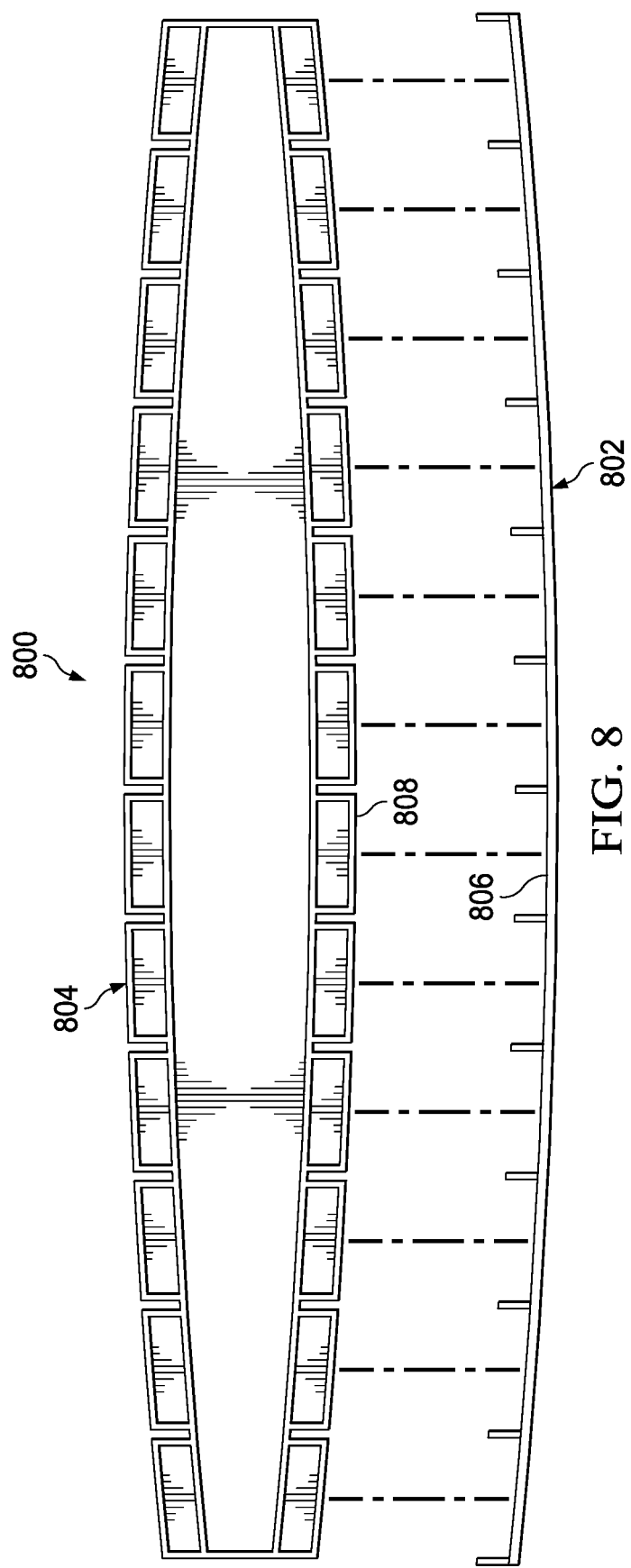
FIG. 8 is an illustration of a part and a second part manufactured based on differences between a first surface of the part and a design for the first surface in accordance with an illustrative embodiment.

Turning now to FIG. 8, an illustration of a part and a second part manufactured based on differences between a first surface of the part and a design for the first surface is depicted in accordance with an illustrative embodiment. In view 800, part 802 and second part 804 are visible. Part 802 is a physical implementation of part 111 of FIG. 1. Second part 804 is a physical implementation of second part 162 of FIG. 1.

First surface 806 will desirably contact second surface 808 when assembled. In these illustrative examples, second part 804 may be manufactured based on differences between first surface 806 of part 802 and a design for first surface 806. Second surface 808 is manufactured to mate with first surface 806. Second surface 808 is manufactured for shimless manufacturing.

Figure 9:
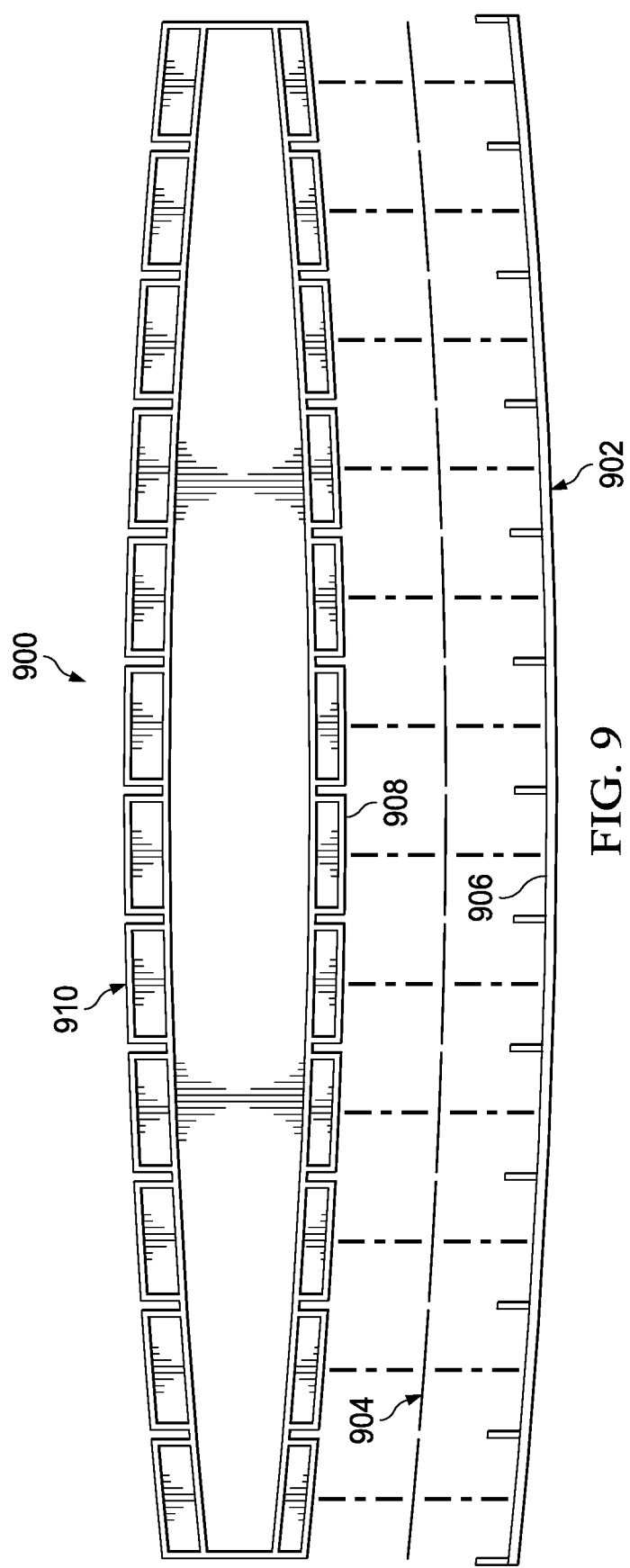
FIG. 9 is an illustration of a part and shims manufactured based on differences between a first surface of the part and a design for the first surface in accordance with an illustrative embodiment.

Turning now to FIG. 9, an illustration of a part and shims manufactured based on differences between a first surface of the part and a design for the first surface is depicted in accordance with an illustrative embodiment. In view 900, part 902 and shims 904 are visible. Part 902 is a physical implementation of part 111 of FIG. 1. Shims 904 are a physical implementation of shims 156 of FIG. 1. Shims 904 are manufactured based on differences between first surface 906 of part 902 and a design for first surface 906. Shims 904 are a result of predictive shimming. In some illustrative examples, shims 904 are also manufactured based on differences between second surface 908 of second part 910 and a design for second surface 908.

Figure 10:
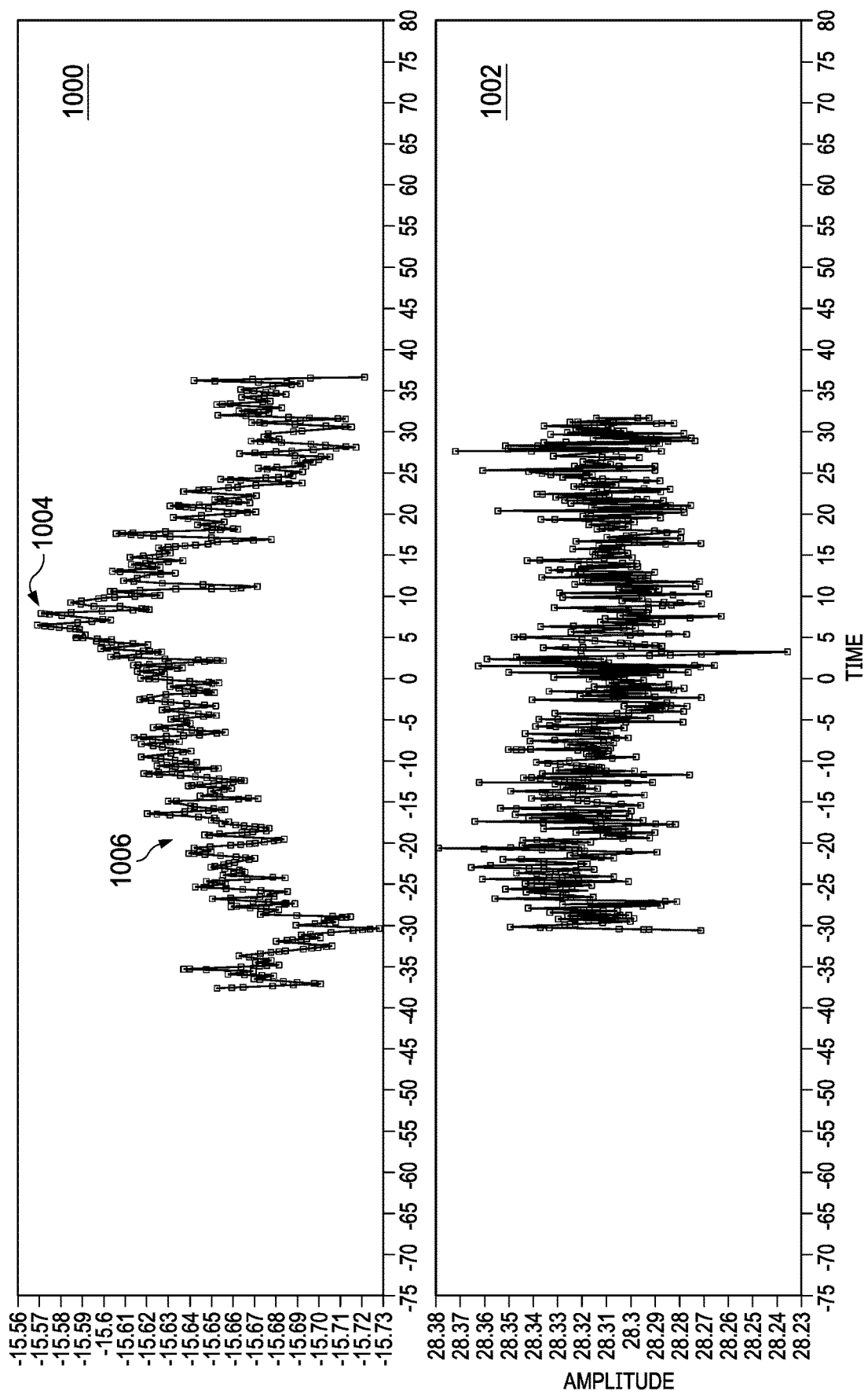
FIG. 10 is an illustration of a reduction of noise in scan data from a laser scanner in accordance with an illustrative embodiment.

Turning now to FIG. 10, an illustration of a reduction of noise in scan data from a laser scanner is depicted in accordance with an illustrative embodiment. In FIG. 10, scan data 1000 is of a flat plane without laser range optimization. Scan data 1000 may be formed using laser scanner 102 of FIG. 1 or laser scanner 204 of FIG. 2. Scan data 1002 is of a flat plane with laser range optimization. Scan data 1000 is not substantially planar. Scan data 1000 has peak 1004.

Scan data 1002 does not have peak 1004. Scan data 1002 compensates for signature 1006 including peak 1004. Scan data 1002 is flatter than scan data 1000.

Figure 11:
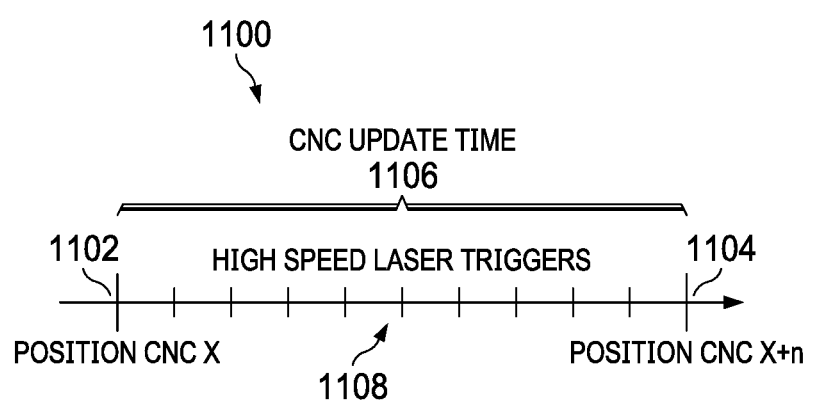
FIG. 11 is an illustration of a quantity of laser pulses between position updates of a computer numerical controlled (CNC) gantry tool in accordance with an illustrative embodiment.

Turning now to FIG. 11, an illustration of a quantity of laser pulses between position updates of a computer numerical controlled (CNC) gantry tool is depicted in accordance with an illustrative embodiment. View 1100 is a view of position update 1102 and position update 1104 separated by time 1106. Time 1106 is a CNC update time. As depicted, laser pulses 1108 are between position update 1102 and position update 1104. As depicted, laser pulses 1108 include nine pulses of a laser scanner, such as laser scanner 102 of FIG. 1 or laser scanner 204 of FIG. 2.

Figure 12:
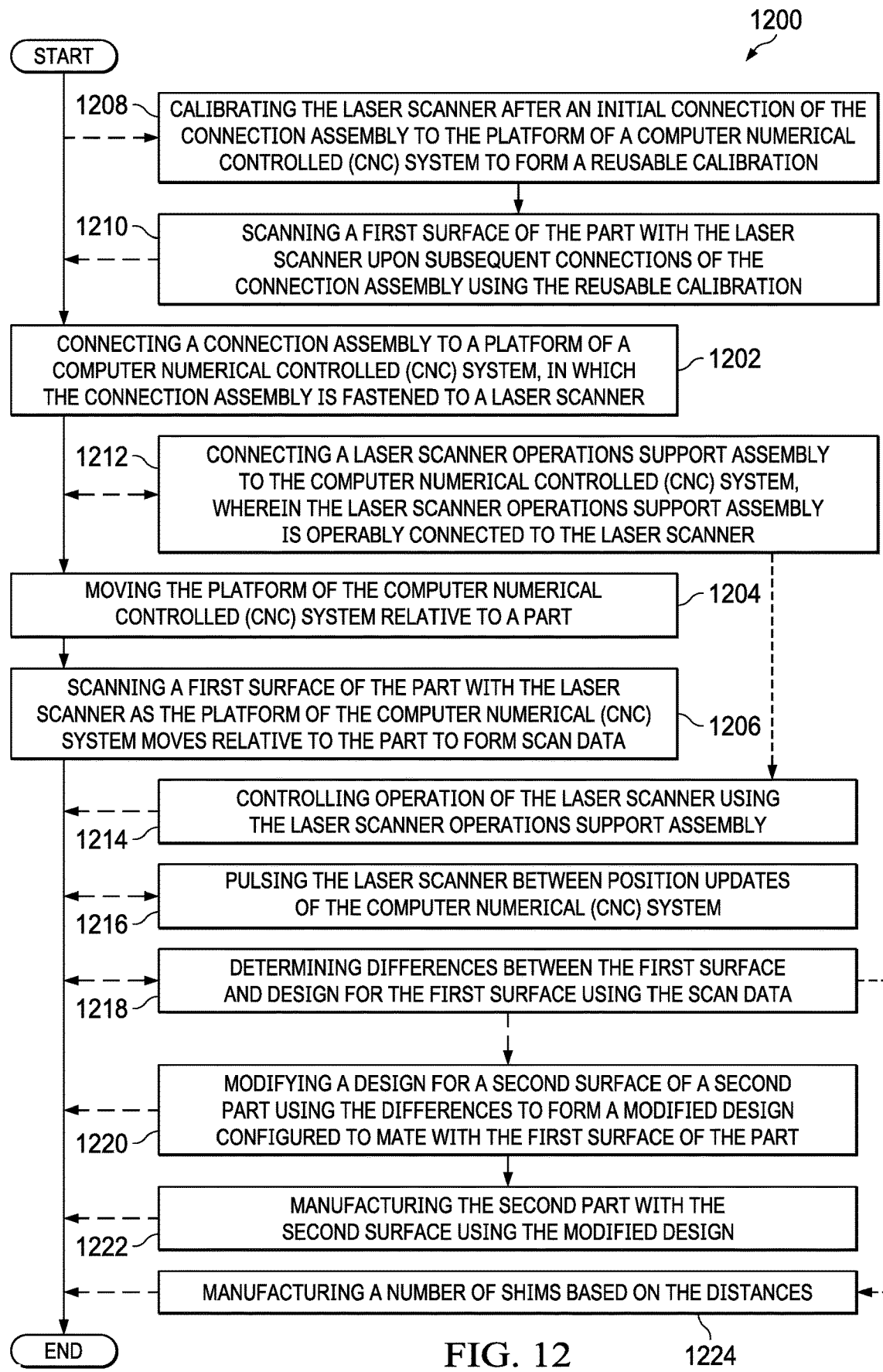
FIG. 12 is an illustration of a flowchart of a method for scanning a part using a laser scanner in accordance with an illustrative embodiment.

Turning now to FIG. 12, an illustration of a flowchart of a method for scanning a part using a laser scanner is depicted in accordance with an illustrative embodiment. Method 1200 may be used to scan part 111 of FIG. 1. Method 1200 may be implemented using laser scanner 204 and computer numerical controlled (CNC) gantry tool 202 of FIGS. 2-4. Method 1200 may be implemented using laser scanner 502 of FIG. 5. Method 1200 may be implemented using laser scanner 602 of FIG. 6. Method 1200 may be implemented using laser scanner operations support assembly 700 of FIG. 7. Method 1200 may be used to perform shimless manufacturing. Method 1200 may be performed to manufacture second part 804 of FIG. 8. Method 1200 may be used to perform predictive shimming. Method 1200 may be performed to manufacture shims 904 of FIG. 9.

Method 1200 connects a connection assembly to a platform of a computer numerical controlled (CNC) system, in which the connection assembly is fastened to a laser scanner (operation 1202). By connecting the connection assembly to the platform, the laser scanner is connected to the computer numerical controlled (CNC) system. In some illustrative examples, the computer numerical controlled (CNC) system takes the form of a computer numerical controlled (CNC) gantry tool.

Method 1200 moves the platform of the computer numerical controlled (CNC) system relative to a part (operation 1204). Moving the platform of the computer numerical controlled (CNC) system also moves the connected laser scanner. Method 1200 scans a first surface of the part with the laser scanner as the platform of the computer numerical controlled (CNC) system moves relative to the part to form scan data (operation 1206). Afterwards, the method terminates.

In some illustrative examples, method 1200 calibrates the laser scanner after an initial connection of the connection assembly to the platform of a computer numerical controlled (CNC) system to form a reusable calibration (operation 1208). In some illustrative examples, method 1200 scans a first surface of the part with the laser scanner upon subsequent connections of the connection assembly using the reusable calibration (operation 1210). The reusable calibration reduces set-up time for the laser scanner.

In some illustrative examples, method 1200 connects a laser scanner operations support assembly to the computer numerical controlled (CNC) system, wherein the laser scanner operations support assembly is operably connected to the laser scanner (operation 1212). By having the laser scanner operations support assembly to the computer numerical controlled (CNC) system, the distance between the laser scanner and the laser scanner operations support assembly is relatively short. For example, by having the laser scanner operations support assembly to the computer numerical controlled (CNC) system, the distance between the laser scanner and the laser scanner operations support assembly may be a few feet. By having the laser scanner operations support assembly to the computer numerical controlled (CNC) system, the length of communication cables for laser scanner operations support assembly is reduced. By having the laser scanner operations support assembly to the computer numerical controlled (CNC) system, laser noise may be reduced. In some illustrative examples, method 1200 controls operation of the laser scanner using the laser scanner operations support assembly (operation 1214).

In some illustrative examples, method 1200 pulses the laser scanner between position updates of the computer numerical controlled (CNC) system (operation 1216). Timing compensation interpolation takes into account delays between receipt of data from the computer numerical controlled (CNC) system by a real-time central processing unit (CPU) of the laser scanner operation support assembly and an actual location of the real-time central processing unit (CPU). Timing compensation interpolation enables more frequent sampling from the laser scanner than position updates of the computer numerical controlled (CNC) system.

Timing compensation interpolation allows for pulsing of laser scanner between position updates of computer numerical controlled (CNC) system. Timing compensation interpolation increases the speed of scanning of part.

In some illustrative examples, method 1200 determines differences between the first surface and a design for the first surface using the scan data (operation 1218).

In some illustrative examples, method 1200 modifies a design for a second surface of a second part using the differences to form a modified design configured to mate with the first surface of the part (operation 1220). In some illustrative examples, method 1200 manufactures the second part with the second surface using the modified design (operation 1222).

In some illustrative examples, method 1200 manufactures a number of shims based on the differences (operation 1224). In some illustrative examples, the number of shims is also manufactured based on data regarding second differences between an as manufactured second surface of a second part a design for the second surface of the second part are taken into account when manufacturing the number of shims. The data regarding the second differences may be gathered in any desirable fashion. By taking into account both the differences and the second differences, the number of shims take into account manufacturing variations in both the first surface and the second surface.

Figure 13:
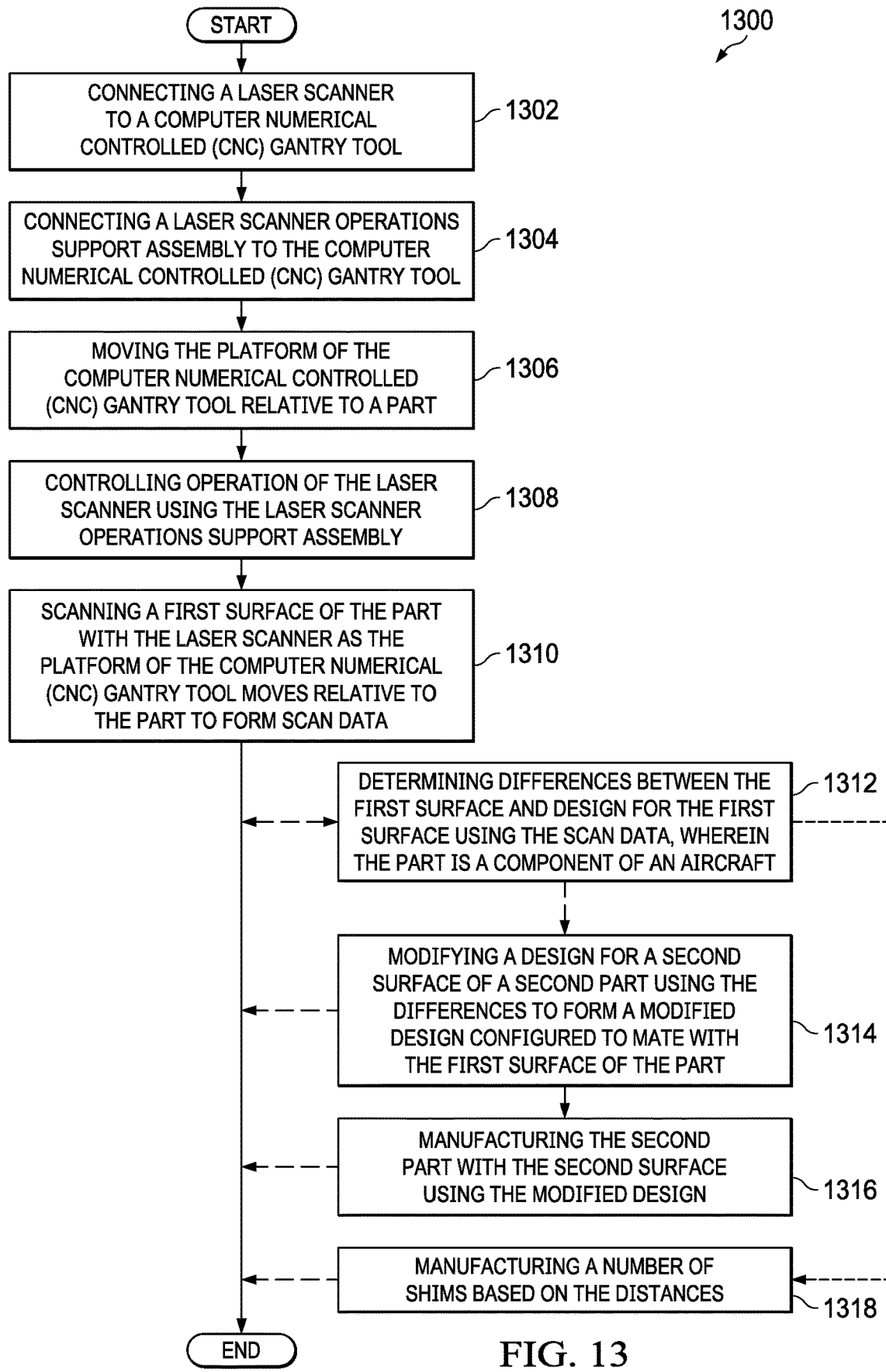
FIG. 13 is another illustration of a flowchart of a method for scanning a part using a laser scanner in accordance with an illustrative embodiment.

Turning now to FIG. 13, an illustration of a flowchart of a method for scanning a part using a laser scanner is depicted in accordance with an illustrative embodiment. Method 1300 may be used to scan part 111 of FIG. 1. Method 1300 may be implemented using laser scanner 204 and computer numerical controlled (CNC) gantry tool 202 of FIGS. 2-4. Method 1300 may be implemented using laser scanner 502 of FIG. 5. Method 1300 may be implemented using laser scanner 602 of FIG. 6. Method 1300 may be implemented using laser scanner operations support assembly 700 of FIG. 7. Method 1300 may be used to perform shimless manufacturing. Method 1300 may be performed to manufacture second part 804 of FIG. 8. Method 1300 may be used to perform predictive shimming. Method 1300 may be performed to manufacture shims 904 of FIG. 9.

Method 1300 connects a laser scanner to a computer numerical controlled (CNC) gantry tool (operation 1302). Method 1300 connects a laser scanner operations support assembly to the computer numerical controlled (CNC) gantry tool (operation 1304). Method 1300 moves the platform of the computer numerical controlled (CNC) gantry tool relative to a part (operation 1306). Method 1300 controls operation of the laser scanner using the laser scanner operations support assembly (operation 1308). Method 1300 scans a first surface of the part with the laser scanner as the platform of the computer numerical controlled (CNC) gantry tool moves relative to the part to form scan data (operation 1310). Afterwards, the method terminates.

In some illustrative examples, method 1300 determines differences between the first surface and a design for the first surface using the scan data, wherein the part is a component of an aircraft (operation 1312). In some illustrative examples, method 1300 modifies a design for a second surface of a second part using the differences to form a modified design configured to mate with the first surface of the part (operation 1314). In some illustrative examples, method 1300 manufactures the second part with the second surface using the modified design (operation 1316).

In some illustrative examples, method 1300 manufactures a number of shims based on the differences (operation 1318). In some illustrative examples, the number of shims is also manufactured based on data regarding second differences between an as manufactured second surface of a second part a design for the second surface of the second part are taken into account when manufacturing the number of shims. The data regarding the second differences may be gathered in any desirable fashion. By taking into account both the differences and the second differences, the number of shims take into account manufacturing variations in both the first surface and the second surface.

Figure 14:
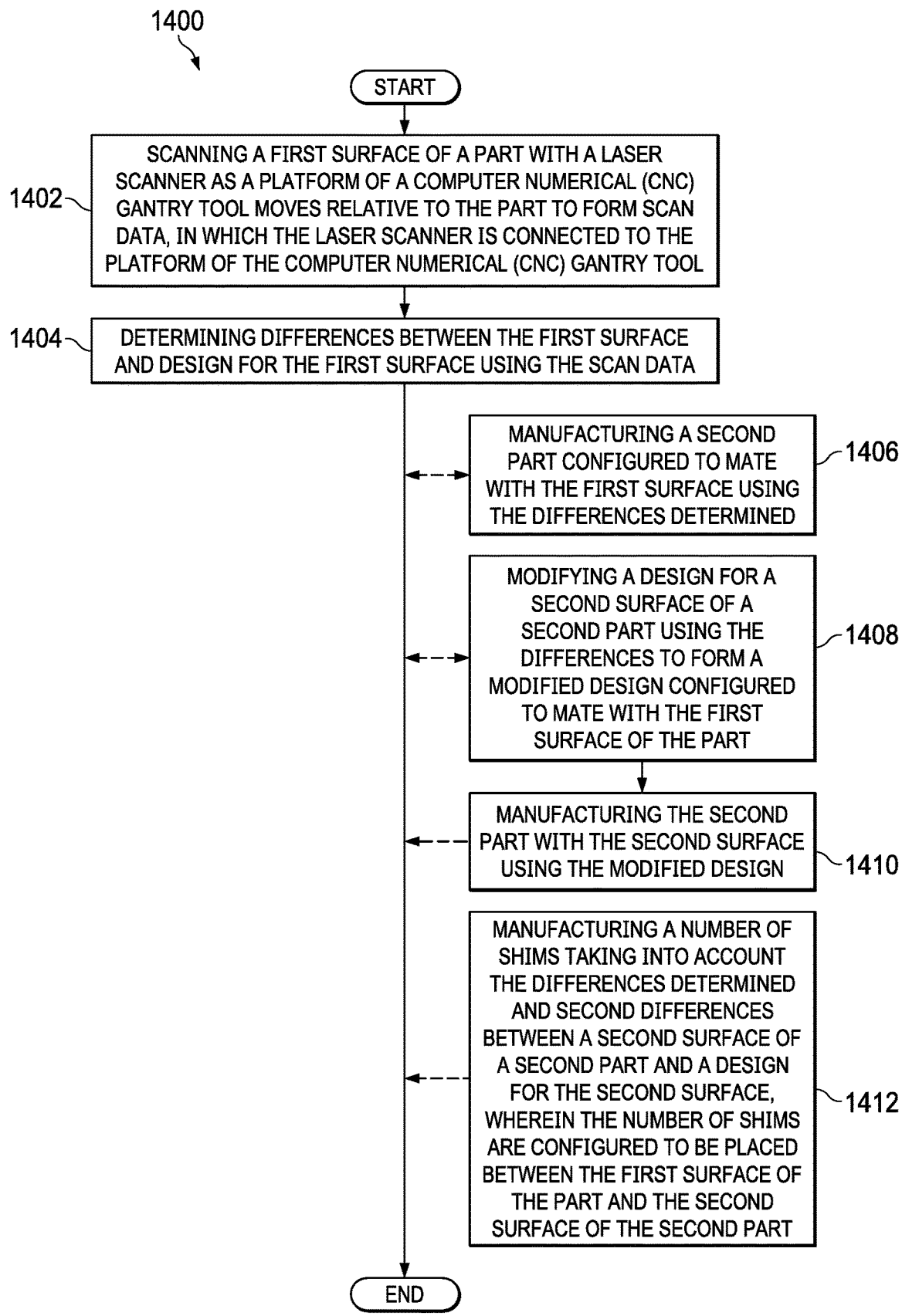
FIG. 14 is yet another illustration of a flowchart of a method for scanning a part using a laser scanner in accordance with an illustrative embodiment.

Turning now to FIG. 14, an illustration of a flowchart of a method for scanning a part using a laser scanner is depicted in accordance with an illustrative embodiment. Method 1400 may be used to scan part 111 of FIG. 1. Method 1400 may be implemented using laser scanner 204 and computer numerical controlled (CNC) gantry tool 202 of FIGS. 2-4. Method 1400 may be implemented using laser scanner 502 of FIG. 5. Method 1400 may be implemented using laser scanner 602 of FIG. 6. Method 1400 may be implemented using laser scanner operations support assembly 700 of FIG. 7. Method 1400 may be used to perform shimless manufacturing. Method 1400 may be performed to manufacture second part 804 of FIG. 8. Method 1400 may be used to perform predictive shimming. Method 1400 may be performed to manufacture shims 904 of FIG. 9.

Method 1400 scans a first surface of a part with a laser scanner as a platform of a computer numerical controlled (CNC) gantry tool moves relative to the part to form scan data, in which the laser scanner is connected to the platform of the computer numerical controlled (CNC) gantry tool (operation 1402). Method 1400 determines differences between the first surface and design for the first surface using the scan data (operation 1404). Afterwards, method 1400 terminates.

In some illustrative examples, method 1400 manufactures a second part configured to mate with the first surface using the differences determined (operation 1406). In some illustrative examples, method 1400 modifies a design for a second surface of the second part using the differences to form a modified design configured to mate with the first surface of the part (operation 1408). In some illustrative examples, method 1400 further manufactures the second part with the second surface using the modified design (operation 1410).

In some illustrative examples, method 1400 manufactures a number of shims taking into account the differences determined and second differences between a second surface of a second part and a design for the second surface, wherein the number of shims are configured to be placed between the first surface of the part and the second surface of the second part (operation 1412).

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

In some illustrative examples, not all blocks of method 1200, method 1300, or method 1400 are performed. For example, operations 1208 through 1224 of FIG. 12 are optional. As another example, operations 1312 through 1318 of FIG. 13 are optional. As yet another example, operations 1406 through 1412 of FIG. 14 are optional.

Figure 15:
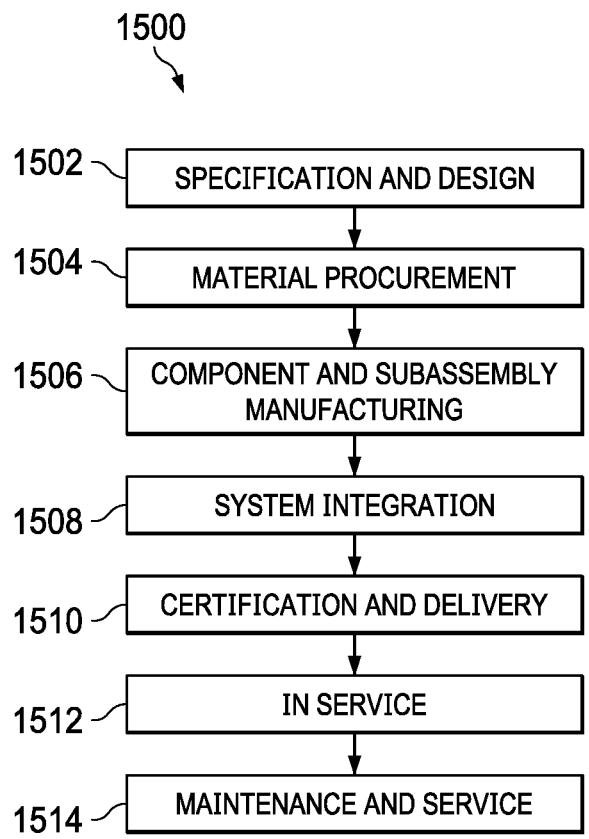
FIG. 15 is an illustration of an aircraft manufacturing and service method in the form of a block diagram in accordance with an illustrative embodiment.
Figure 16:
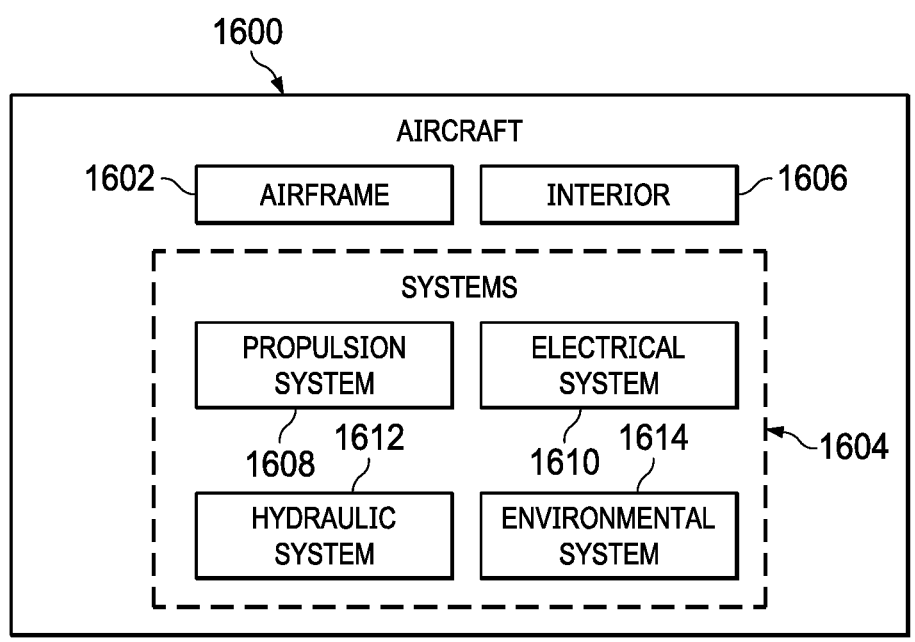
FIG. 16 is an illustration of an aircraft in the form of a block diagram in which an illustrative embodiment may be implemented.

The illustrative embodiments of the present disclosure may be described in the context of aircraft manufacturing and service method 1500 as shown in FIG. 15 and aircraft 1600 as shown in FIG. 16. Turning first to FIG. 15, an illustration of an aircraft manufacturing and service method is depicted in accordance with an illustrative embodiment. During pre-production, aircraft manufacturing and service method 1500 may include specification and design 1502 of aircraft 1600 in FIG. 16 and material procurement 1504.

During production, component and subassembly manufacturing 1506 and system integration 1508 of aircraft 1600 takes place. Thereafter, aircraft 1600 may go through certification and delivery 1510 in order to be placed in service 1512. While in service 1512 by a customer, aircraft 1600 is scheduled for routine maintenance and service 1514, which may include modification, reconfiguration, refurbishment, and other maintenance or service.

Each of the processes of aircraft manufacturing and service method 1500 may be performed or carried out by a system integrator, a third party, and/or an operator. In these examples, the operator may be a customer. For the purposes of this description, a system integrator may include, without limitation, any number of aircraft manufacturers or major-system subcontractors; a third party may include, without limitation, any number of vendors, subcontractors, or suppliers; and an operator may be an airline, a leasing company, a military entity, a service organization, and so on.

With reference now to FIG. 16, an illustration of an aircraft is depicted in which an illustrative embodiment may be implemented. In this example, aircraft 1600 is produced by aircraft manufacturing and service method 1500 in FIG. 15 and may include airframe 1602 with a plurality of systems 1604 and interior 1606. Examples of systems 1604 include one or more of propulsion system 1608, electrical system 1610, hydraulic system 1612, and environmental system 1614. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1500. One or more illustrative embodiments may be used during component and subassembly manufacturing 1506, system integration 1508, or maintenance and service 1514 of FIG. 15. For example, laser scanner 102 of FIG. 1 attached to computer numerical controlled (CNC) gantry tool 110 of FIG. 1 may be used to perform shimless manufacturing or predictive shimming during component and subassembly manufacturing 1506. As another example, laser scanner 102 attached to computer numerical controlled (CNC) gantry tool 110 may be used to scan a replacement part during maintenance and service 1514 of FIG. 15.

Apparatuses and methods embodied herein may be employed in manufacturing at least one component of aircraft 1600. For example, scan data 148 of FIG. 1 may be used to manufacture shims 156 or second part 162 to form a portion of airframe 1602 or interior 1606.

To reduce manufacturing cost and time, an apparatus and methods are provided to allow for at least one of prediction of shims in aircrafts parts or the manufacturing of shimless parts. The illustrative examples provide methods to efficiently measure and inspect such parts. The illustrative examples, including the apparatus and methods, describe an add-on system that can be integrated into current trim cells or other CNC system, enabling fast, efficient, and highly accurate scanning.

These illustrative examples provide a portable system that consists of at least one of one or more two-dimensional laser scanners, a laser controller, a real-time CPU with High Speed FPGA, a battery, and a wireless connection to CNC Control trim and Drill Cell. The hardware of the illustrative examples allows for a highly synchronized system that enables accurate high-speed scanning. The illustrative examples reduce scanning time from about eight hours or more to approximately 15 minutes. The technology architecture of the illustrative examples provides inspection at a much lower cost than conventional laser inspection. The illustrative examples avoid costly retrofits from running additional cables through the CNC gantry.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
   scanning a first surface of a part with a laser scanner as a platform of a computer numerical controlled (CNC) gantry tool moves relative to the part to form scan data, in which the laser scanner is connected to the platform of the computer numerical controlled (CNC) gantry tool, wherein the computer numerical controlled (CNC) gantry tool is configured to perform manufacturing operations; and
determining differences between the first surface and a design for the first surface using the scan data.

2. The method of claim 1 further comprising:
manufacturing a second part configured to mate with the first surface using the differences determined.

3. The method of claim 1 further comprising:
modifying a design for a second surface of a second part using the differences to form a modified design configured to mate with the first surface of the part.

4. The method of claim 3 further comprising:
manufacturing the second part with the second surface using the modified design.

5. The method of claim 1 further comprising:
manufacturing a number of shims taking into account the differences determined and second differences between a second surface of a second part and a design for the second surface, wherein the number of shims are configured to be placed between the first surface of the part and the second surface of the second part.

6. The method of claim 1, wherein the computer numerical controlled (CNC) gantry tool moves both the computer numerical controlled (CNC) gantry tool and the laser scanner within a same manufacturing environment.

7. A method comprising:
connecting a connection assembly to a platform of a computer numerical controlled (CNC) system, in which the connection assembly is fastened to a laser scanner;
moving the platform of the computer numerical controlled (CNC) system relative to a part; and
scanning a first surface of the part with the laser scanner as the platform of the computer numerical controlled (CNC) system moves relative to the part to form scan data, wherein the computer numerical controlled (CNC) system is configured to perform manufacturing operations.

8. The method of claim 7 further comprising:
connecting a laser scanner operations support assembly to the computer numerical controlled (CNC) system, wherein the laser scanner operations support assembly is operably connected to the laser scanner.

9. The method of claim 8 further comprising:
controlling operation of the laser scanner using the laser scanner operations support assembly.

10. The method of claim 7 further comprising:
determining differences between the first surface and a design for the first surface using the scan data.

11. The method of claim 10 further comprising:
modifying a design for a second surface of a second part using the differences to form a modified design configured to mate with the first surface of the part; and
manufacturing the second part with the second surface using the modified design.

12. The method of claim 10 further comprising:
manufacturing a number of shims based on the differences.

13. The method of claim 7 further comprising:
calibrating the laser scanner after an initial connection of the connection assembly to the platform of a computer numerical controlled (CNC) system to form a reusable calibration; and
scanning a first surface of the part with the laser scanner upon subsequent connections of the connection assembly using the reusable calibration.

14. The method of claim 7 further comprising:
pulsing the laser scanner between position updates of the computer numerical controlled (CNC) system.

15. A method comprising:
connecting a laser scanner to a computer numerical controlled (CNC) gantry tool, wherein the computer numerical controlled (CNC) gantry tool is configured to perform manufacturing operations;
connecting a laser scanner operations support assembly to the computer numerical controlled (CNC) gantry tool;
moving a platform of the computer numerical controlled (CNC) gantry tool relative to a part;
controlling operation of the laser scanner using the laser scanner operations support assembly; and
scanning a first surface of the part with the laser scanner as the platform of the computer numerical controlled (CNC) gantry tool moves relative to the part to form scan data.

16. The method of claim 15 further comprising:
determining differences between the first surface and a design for the first surface using the scan data, wherein the part is a component of an aircraft.

17. The method of claim 16 further comprising:
modifying a design for a second surface of a second part using the differences to form a modified design configured to mate with the first surface of the part; and
manufacturing the second part with the second surface using the modified design.

18. The method of claim 16 further comprising:
manufacturing a number of shims based on the differences.

19. A system comprising:
a laser scanner;
a connection assembly fastened to the laser scanner, the connection assembly configured to removably connect the laser scanner to a platform of a computer numerical controlled (CNC) system, wherein the computer numerical controlled (CNC) system is configured to perform manufacturing operations; and
a laser scanner operations support assembly operably connected to the laser scanner and configured to be connected to the computer numerical controlled (CNC) system.

20. The system of claim 19, wherein the connection assembly comprises an indexing component and an adapter plate, the indexing component configured to repeatably index the laser scanner relative to a platform of a computer numerical controlled (CNC) system.

21. The system of claim 20, wherein the indexing component has sufficient accuracy to allow a single calibration of the laser scanner attached to the computer numerical controlled (CNC) system to be applied to each subsequent attachment of the laser scanner to the computer numerical controlled (CNC) system.

22. The system of claim 19 further comprising:
a second laser scanner fastened to the connection assembly.

23. The system of claim 19, wherein the laser scanner operations support assembly comprises:
a real-time central processing unit (CPU);
a laser controller; and
at least one of a RF wireless coupler or an optical coupler.

24. The system of claim 23, wherein the laser scanner operations support assembly further comprises a battery.

25. The system of claim 24, wherein the battery is electrically connected to the laser controller and the real-time central processing unit (CPU).

26. The system of claim 25, wherein the battery, the real-time central processing unit (CPU), and the laser controller are in a container removably connected to the computer numerical controlled (CNC) gantry tool.

27. The system of claim 23, wherein the CPU includes a high-speed field-programmable gate array (FPGA).

28. The system of claim 19 wherein the computer numerical controlled (CNC) system is a computer numerical controlled (CNC) gantry tool, the system further comprising:
   the computer numerical controlled (CNC) gantry tool; and
   a CNC controller in communication with the computer numerical controlled (CNC) gantry tool and a real-time central processing unit (CPU) of the laser scanner operations support assembly.

29. The system of claim 28, wherein the connection assembly is connected to the platform of the computer numerical controlled (CNC) gantry tool, and wherein the platform of the computer numerical controlled (CNC) gantry tool is moveable relative to a component of an aircraft.

* * * * *